(12) United States Patent
Shimizu et al.

(10) Patent No.: US 9,882,291 B2
(45) Date of Patent: Jan. 30, 2018

(54) ELECTRIC WIRE WITH TERMINAL, AND METHOD FOR MANUFACTURING SAME

(71) Applicant: YAZAKI CORPORATION, Tokyo (JP)

(72) Inventors: Tomohiko Shimizu, Shizuoka (JP); Yusuke Matsumoto, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 15/470,964

(22) Filed: Mar. 28, 2017

(65) Prior Publication Data

US 2017/0201033 A1 Jul. 13, 2017

Related U.S. Application Data

(63) Continuation of application No. PCT/JP2015/079567, filed on Oct. 20, 2015.

(30) Foreign Application Priority Data

Oct. 31, 2014 (JP) ................................. 2014-222270
Nov. 14, 2014 (JP) ................................. 2014-231441

(51) Int. Cl.
| | |
|---|---|
| *H01R 43/24* | (2006.01) |
| *H01R 4/18* | (2006.01) |
| *H01R 4/70* | (2006.01) |
| *H01R 4/58* | (2006.01) |

(52) U.S. Cl.
CPC ............... *H01R 4/185* (2013.01); *H01R 4/58* (2013.01); *H01R 4/70* (2013.01)

(58) Field of Classification Search
CPC .. H01R 43/24; H01R 13/5845; H01R 13/405; H01R 4/185; H01R 4/184
USPC ................................. 439/606, 604, 877–882
See application file for complete search history.

(56) References Cited

U.S. PATENT DOCUMENTS

| | | | |
|---|---|---|---|
| 9,667,011 B2 * | 5/2017 | Sato ..................... | H01R 43/005 |
| 9,673,586 B2 * | 6/2017 | Sato ..................... | H01R 43/005 |
| 2001/0003687 A1 * | 6/2001 | Kondo ..................... | H01R 4/70 |
| | | | 439/604 |

(Continued)

FOREIGN PATENT DOCUMENTS

| | | |
|---|---|---|
| JP | H5-218275 A | 8/1993 |
| JP | H6-338583 A | 12/1994 |

(Continued)

OTHER PUBLICATIONS

Japanese Office Action dated Apr. 24, 2017 in the counterpart Japanese patent application.

(Continued)

*Primary Examiner* — Gary Paumen
(74) *Attorney, Agent, or Firm* — Metrolexis Law Group, PLLC

(57) ABSTRACT

An electric wire with a terminal is formed by coating a crimp terminal and a crimp connection portion of an electric wire with an anti-corrosive material. When the electric wire with a terminal is manufactured, in a step of setting the terminal in a mold, in a position within a cavity corresponding to the upper surface of a front end of the anti-corrosive material, a release promoting member for promoting release of the mold from a resin is arranged, and in such a state, the anti-corrosive material is molded.

4 Claims, 13 Drawing Sheets

(56) References Cited

U.S. PATENT DOCUMENTS

| | | | | |
|---|---|---|---|---|
| 2001/0003688 | A1* | 6/2001 | Kondo | B29C 45/14426 439/604 |
| 2004/0142597 | A1* | 7/2004 | Mizutani | B29C 45/14311 439/606 |
| 2011/0070770 | A1* | 3/2011 | Sakai | H01R 4/70 439/521 |
| 2013/0126234 | A1* | 5/2013 | Ono | H02G 15/08 174/75 R |
| 2013/0252459 | A1 | 9/2013 | Tanaka et al. | |
| 2015/0021090 | A1* | 1/2015 | Mano | H01R 4/185 174/72 A |
| 2015/0091206 | A1* | 4/2015 | Sato | B29C 45/14065 264/229 |
| 2015/0111424 | A1* | 4/2015 | Sato | H01R 4/70 439/606 |
| 2015/0123306 | A1 | 5/2015 | Sato et al. | |
| 2015/0132993 | A1* | 5/2015 | Osada | B29C 45/14639 439/606 |
| 2016/0134028 | A1* | 5/2016 | Kondo | H01R 4/70 439/877 |
| 2016/0261054 | A1 | 9/2016 | Sato et al. | |

FOREIGN PATENT DOCUMENTS

| | | |
|---|---|---|
| JP | H7-161896 A | 6/1995 |
| JP | 2003-217703 A | 7/2003 |
| JP | 2010-50886 A | 3/2010 |
| JP | 2012-59518 A | 3/2012 |
| JP | 2012-124100 A | 6/2012 |
| JP | 2012-129178 A | 7/2012 |
| JP | 2014-13657 A | 1/2014 |
| JP | 2014-26796 A | 2/2014 |
| JP | 2014-26797 A | 2/2014 |
| JP | 2015-95388 A | 5/2015 |

OTHER PUBLICATIONS

The Japanese Office Action dated Jul. 26, 2016 in the counterpart Japanese patent application.

The Japanese Office Action dated Jan. 10, 2017 in the counterpart Japanese patent application.

Written Opinion of the International Searching Authority (Form PCT/ISA/237) dated Dec. 15, 2015 in PCT International application PCT/JP2015/079567 (English translation of the Written Opinion will be issued and uploaded to PATENTSCOPE of WIPO).

Japanese Office Action dated Oct. 10, 2017 in the counterpart Japanese patent application.

* cited by examiner

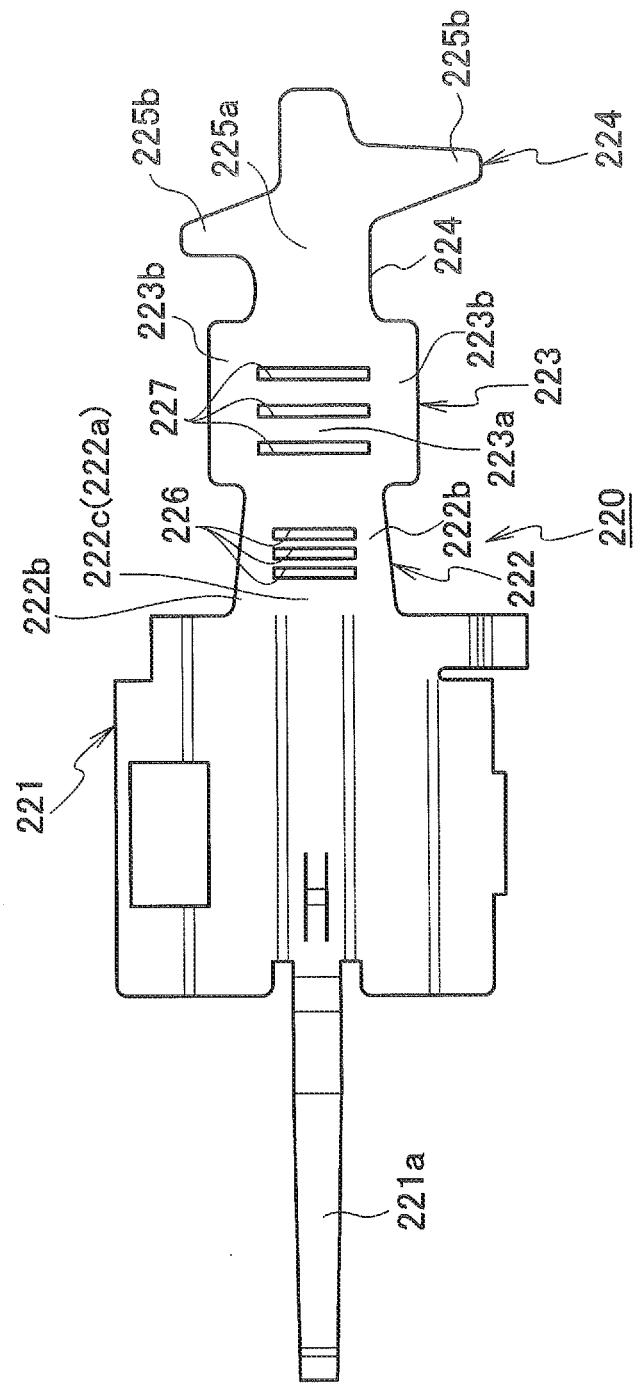

ELECTRIC WIRE WITH TERMINAL, AND
METHOD FOR MANUFACTURING SAME

CROSS REFERENCE TO RELATED
APPLICATION

This is a continuation of PCT Application No. PCT/JP2015/079567, filed on Oct. 20, 2015, and claims the priority of Japanese Patent Applications No. 2014-222270, filed on Oct. 31, 2014 and No. 2014-231441, filed on Nov. 14, 2014, the content of both of which is incorporated herein by reference.

TECHNICAL FIELD

The present invention relates to an electric wire with a terminal in which a crimp connection portion of the terminal and the electric wire is coated with an anti-corrosive material made of resin and to a method for manufacturing the same.

BACKGROUND ART

It is known that a connection portion of different types of metals is easily corroded by the intrusion of water and chloride ions. Hence, for example, when the material of a conductor of a coated electric wire and the material of a crimp terminal differ from each other, the circumference of a crimp connection portion of the electric wire and the crimp terminal is coated with an anti-corrosive material made of resin.

In recent years, examples have been increasingly present where in terms of the reduction in weight of a vehicle, instead of a copper wire (a coated electric wire in which copper or a copper alloy is used as an internal conductor), an aluminum electric wire (a coated electric wire in which aluminum or an aluminum alloy is used as an internal conductor) is used. Hence, an electric wire with a terminal is proposed in which a connection portion of the aluminum electric wire and a crimp terminal made of copper that is conventionally generally used is coated with an anti-corrosive material (Japanese Patent Laid-Open Publication No. 2014-26796).

A conventional electric wire with a terminal and a method for manufacturing the same will be described with reference to FIGS. 1 to 5.

As shown in FIGS. 1 and 3, the electric wire with a terminal includes an electric wire W which has a conductor (core wire) Wa and an insulating coating Wb that coats the conductor Wa, a crimp terminal 10 which is connected to a terminal of the electric wire W and an anti-corrosive material 20 made of resin which is provided so as to coat a connection portion of the electric wire W and the crimp terminal 10.

The crimp terminal 10 has, in its front portion, an electrical connection portion (terminal connection portion) 11 which is fitted to a mating terminal so as to be electrically connected to the mating terminal, and has, in its back portion, a conductor crimp portion 12 which is crimp-connected to the conductor Wa of the electric wire W through a connection portion 15. The crimp terminal 10 has, in its further back portion, a coating swaged portion 13 which is swaged to a portion of the electric wire W with the coated electric wire Wb.

In the crimp terminal 10, a common terminal bottom plate 10a is extended from the electrical connection portion 11 to the coating swaged portion 13 in a forward/backward direction. The connection portion 15, having a U-shaped cross section, includes a bottom plate 15a common to the terminal bottom plate 10a, and left and right side plates 15b and 15b which stand up from both side edges of the bottom plate 15a in the width direction thereof.

The conductor crimp portion 12 is crimp-connected to the conductor Wa in a state where in the terminal of the electric wire W, an exposed portion of the conductor Wa protruding forward from the insulating coating Wb is placed on the terminal bottom plate 10a. Behind this crimp connection portion 12A, a conductor swaged piece 13 is swaged so as to wrap the coated electric wire Wb of the electric wire W.

The anti-corrosive material 20 is injection-molded with a mold integrally with the electric wire W and the crimp terminal 10 so as to coat the conductor Wa, the circumference of the crimp connection portion 12A of the crimp terminal 10 and the circumference of the insulating coating Wb adjacent to the crimp connection portion 12A.

Specifically, the anti-corrosive material 20 is formed so as to coat the entire portion from a position where the outer circumference of the insulating coating Wb of the electric wire W extended backward of the conductor swaged piece 13 is coated through the front end of the crimp connection portion 12A of the conductor crimp portion 12 to a position at a halfway point of the connection portion 15 in front of the electrical connection portion 11.

When the electric wire with a terminal is manufactured, first, as shown in FIG. 1, the crimp terminal 10 and the electric wire W are crimp-connected (crimp step).

Then, as shown in FIG. 2, the crimp terminal 10 and the electric wire W are set in a mold 100 for injection molding in a state where all the range of the crimp connection portion 12A of the crimp terminal 10 and the electric wire W, the coating swaged portion 13 and the like on which anti-corrosive processing is performed is arranged within the cavity 110 of the mold 100 for molding composed of upper and lower molds 101 and 102 for molding the anti-corrosive material 20 (terminal setting step).

Then, after the terminal setting step, the interior of the cavity 110 of the mold 100 is filled with molten resin 22, and thus the anti-corrosive material 20 is molded (molding step).

After the molding, the mold 100 is released (the upper mold 101 and the lower mold 102 are separated), and thus a molded product is taken out (release step).

Through the steps described above, it is possible to obtain the electric wire with a terminal as shown in FIGS. 3 and 4. The front end portion of the anti-corrosive material 20 is located in the connection portion 15 of the crimp terminal 10, and its cross section is formed as shown in FIG. 5.

CITATION LIST

Patent Literature

Patent Literature 1: Japanese Patent Laid-Open Publication No. 2014-26796
Patent Literature 2: Japanese Patent Laid-Open Publication No. 2012-124100

SUMMARY OF INVENTION

Incidentally, when the anti-corrosive material 20 is molded, in order for the crimp terminal 10 and the resin 22 for the anti-corrosive material 20 to be intensively brought into close contact with each other, the crimp terminal 10 is generally coated with a primer (adhesion enhancement material).

However, since the step of applying the primer is troublesome, it can be considered that resin which is easily brought into close contact with the metal is previously selected and used as the material of the anti-corrosive material 20.

In this case, it is found that when the close contact force of the mold and the resin is greater than that of the terminal and the resin at the time of the release of the mold, it is likely that a separation occurs in an interface between the terminal and the resin, that a gap is formed between the anti-corrosive material and the terminal and that water invades the interior of the crimp connection portion through the gap.

Specifically, first, as shown in FIG. 6A, the upper mold 101 and the lower mold 102 are closed, the cavity 110 is filled with the resin 22 and thus the anti-corrosive material 20 is molded. Thereafter, as shown in FIG. 6B, the mold 100 is released. Here, when the close contact force of an interface N2 between the mold 100 and the resin 22 is greater than that of an interface N1 between the crimp terminal 10 and the resin 22, a separation occurs in the interface N1 between the crimp terminal 10 and the resin 22, and thus a gap S1 is formed between the anti-corrosive material 20 and the crimp terminal 10. Consequently, it is likely that as shown in FIG. 7, through the gap S1, as indicated by an arrow Ys, water invades a contact surface (the interface between the crimp terminal 10 and the conductor Wa) between different types of metals in the crimp connection portion 12A, and that thus the crimp connection portion 12A is corroded. It is found that in particular, when the gap S1 is formed in the position of the connection portion 15 of the crimp terminal 10 which is the entrance side of a water intrusion path in the front end portion of the anti-corrosive material 20, the corrosion is more likely to occur.

The present invention has been made in view of the foregoing conditions, it is an object of the present invention to provide an electric wire with a terminal in which when a mold is released after the molding of an anti-corrosive material, a separation is prevented from occurring in an interface between a terminal and a resin, and in which thus it is possible to ensure an anti-corrosive property and a method for manufacturing the same.

In order to solve the problems described above, an electric wire with a terminal according to a first aspect of the present invention includes: an electric wire which includes a conductor and an insulating coating to coat the conductor; a crimp terminal which includes a conductor crimp portion that is crimp-connected to the conductor in a state where an exposed portion of the conductor protruding forward from the insulating coating at a terminal of the electric wire is placed on a terminal bottom plate extended in a forward/backward direction; an anti-corrosive material which is made of resin and molded integrally with the electric wire and the crimp terminal so as to coat the conductor, a circumference of a crimp connection portion of the crimp terminal and a circumference of the insulating coating adjacent to the crimp connection portion; and a release promoting member which is arranged on a front side of the crimp connection portion and a front end of the conductor and in a position of an upper surface of a front end portion of the anti-corrosive material, which is brought into close contact with an upper surface of an inner wall of a cavity in a mold for molding the anti-corrosive material when the anti-corrosive material is molded and which promotes release of the mold from the resin forming the anti-corrosive material.

In a method for manufacturing an electric wire with a terminal according to a second aspect of the present invention, the electric wire with a terminal includes: an electric wire which includes a conductor and an insulating coating to coat the conductor; a crimp terminal which includes a conductor crimp portion that is crimp connected to the conductor in a state where an exposed portion of the conductor protruding forward from the insulating coating at a terminal of the electric wire is placed on a terminal bottom plate extended in a forward/backward direction; and an anti-corrosive material which is made of resin and molded integrally with the electric wire and the crimp terminal so as to coat the conductor, a circumference of a crimp connection portion of the crimp terminal and a circumference of the insulating coating adjacent to the crimp connection portion, and the method includes: a crimp step of crimp-connecting the crimp terminal and the electric wire; a terminal setting step of setting, after the crimp step, the crimp terminal and the electric wire in a mold in a state where the crimp connection portion of the crimp terminal and the electric wire is arranged within a cavity of the mold for molding the anti-corrosive material; a molding step of filling, after the terminal setting step, an interior of the cavity of the mold with molten resin so as to mold the anti-corrosive material; and a release step of releasing the mold and taking out a molded product after the molding step, wherein in the terminal setting step, a release promoting member for promoting release of the mold from the resin forming the anti-corrosive material when the mold is released is arranged in a position within the cavity corresponding to an upper surface of a front end portion of the anti-corrosive material on a front side of the crimp connection portion and a front end of the conductor, in a state where an upper surface of the member is brought into close contact with an upper surface of an inner wall of the cavity for molding the upper surface of the anti-corrosive material in a closed state of the mold, and where a space which is filled with the resin is secured both between the mold and the crimp connection portion as well as the conductor and between the mold and the terminal bottom plate.

In the method for manufacturing an electric wire with a terminal, the crimp terminal is provided with a connection portion having a U-shaped cross section, which connects the conductor crimp portion and an electrical connection portion for a mating terminal located in front of the conductor crimp portion, and which includes a bottom plate common to the terminal bottom plate of the conductor crimp portion and both left and right side plates that stand up from both side edges of the bottom plate in a width direction, and in the terminal setting step, the crimp terminal and the electric wire are set in the mold, in a state where the release promoting member is placed so as to be bridged between upper ends of the both left and right side plates of the connection portion.

In addition, an electric wire with a terminal according to a third aspect of the present invention includes: an electric wire which includes a core wire and an insulating coating that coats the core wire; a crimp terminal which includes a terminal connection portion that is connected to a mating terminal, a core wire crimp portion that is crimped to the core wire exposed from an end portion of the electric wire and a coating crimp portion that is crimped to an insulating coating of the end portion of the electric wire; and an anti-corrosive material which is molded integrally from a circumference of a coupling portion that connects the terminal connection portion of the crimp terminal and the core wire crimp portion to a circumference of the coating crimp portion, wherein a groove for close contact with resin is formed in an inner surface of the coupling portion.

In the electric wire with a terminal, the coupling portion is formed with a bottom plate portion and a pair of side plate portions extended from both side edges of the bottom plate portion, and the groove is formed into a concave shape in an inner surface of the bottom plate portion.

Moreover, in the electric wire with a terminal, the concave grooves is formed in plurality in the inner surface of the bottom plate portion so as to be extended parallel to a direction perpendicular to a longitudinal direction of the crimp terminal.

According to the aspects of the present invention, when the mold is released after the molding of the anti-corrosive material, the release promoting member serves as the starting point for the separation, and thus it is possible to promote the separation of the resin on the back side of the release promoting member and the mold. Hence, even when a resin which has a strong adhesion to metal is used as the material of the anti-corrosive material without the application of a primer, the problem in which the resin for the anti-corrosive material is brought into close contact with the mold at the time of releasing, in which a separation occurs in the interface between the terminal and the resin and in which consequently chloride ions and water invade the interior of the crimp connection portion through the gap between the terminal and the resin to corrode the electric wire can be solved, with the result that it is possible to enhance the anti-corrosive performance. In particular, the release promoting member is arranged only in the front end of the anti-corrosive material, and thus it is possible to minimize the size of the release promoting member, with the result that there is no worry that the filling of the resin is inhibited. Further, since it is possible to enhance the stability of the place of the connection portion which is most problematic for the separation, it is possible to manufacture a highly reliable electric wire with a terminal.

Moreover, according to the aspects of the present invention, it is possible to arrange the release promoting member in an appropriate position only by placing the release promoting member on the connection portion.

Moreover, according to the aspects of the present invention, the groove for close contact with resin is formed in the inner surface of the coupling portion connecting the terminal connection portion of the crimp terminal and the core wire crimp portion. In this way, it is possible to reliably prevent the crimp terminal and the anti-corrosive material from being separated from each other at the time of releasing in the molding of the resin, with the result that it is possible to enhance the anti-corrosive performance of the connection portion of the terminal and the core wire of the electric wire without the formation of a gap between the crimp terminal and the anti-corrosive material.

Furthermore, the coupling portion on the entrance side of the water intrusion path is formed with a bottom plate portion and a pair of side plate portions extended from both side edges of the bottom plate portion, and the groove is formed into a concave cross section in the inner surface of the bottom plate portion. In this way, it is possible to enhance the adhesion force of the bottom plate portion of the coupling portion and the anti-corrosive material at the time of releasing in the molding of the resin of the anti-corrosive material, and it is possible to reliably prevent a gap from being formed in the place of the water intrusion path on the inner surface of the bottom plate portion of the coupling portion, with the result that it is possible to enhance the anti-corrosive performance.

In addition, the concave grooves are formed in plurality in the inner surface of the bottom plate portion of the coupling portion on the entrance side of the water intrusion path so as to be extended parallel to a direction perpendicular to the longitudinal direction of the crimp terminal. In this way, at the time of releasing in the molding of the resin of the anti-corrosive material, the adhesion force between the bottom plate portion of the coupling portion and the anti-corrosive material can be reliably enhanced by a sliding friction force caused by a plurality of concave vertical grooves. Consequently, it is possible to reliably prevent a gap from being formed in the place of the water intrusion path on the inner surface of the bottom plate portion of the coupling portion, and thus it is possible to further enhance the anti-corrosive performance.

BRIEF DESCRIPTION OF DRAWINGS

FIG. 6A is a diagram showing a state before the releasing and FIG. 6B is a diagram showing a state at the time of the releasing.

FIG. 10A is a diagram showing a state before the releasing and FIG. 10B is a diagram showing a state at the time of the releasing.

FIG. 15 is a development view of a crimp terminal used in the electric wire with a terminal.

DESCRIPTION OF EMBODIMENTS

Embodiments of the present invention will be described below with reference to drawings.

Figure 1:
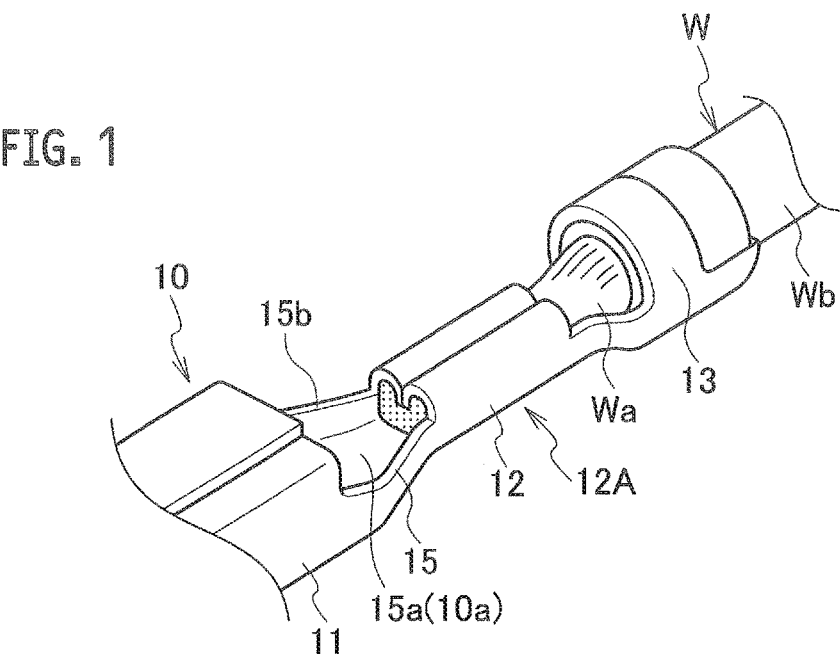
FIG. 1 is an illustrative diagram of part of a manufacturing process of a conventional electric wire with a terminal.
Figure 2:
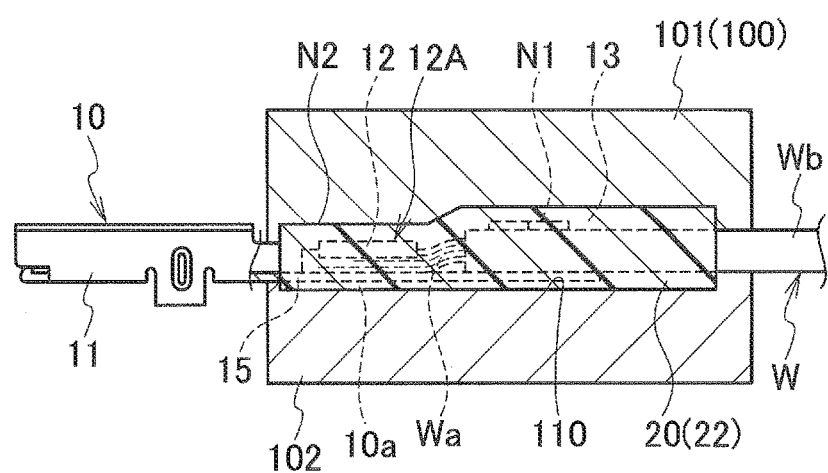
FIG. 2 is an illustrative diagram of a molding step in the manufacturing process of the conventional electric wire with a terminal.
Figure 3:
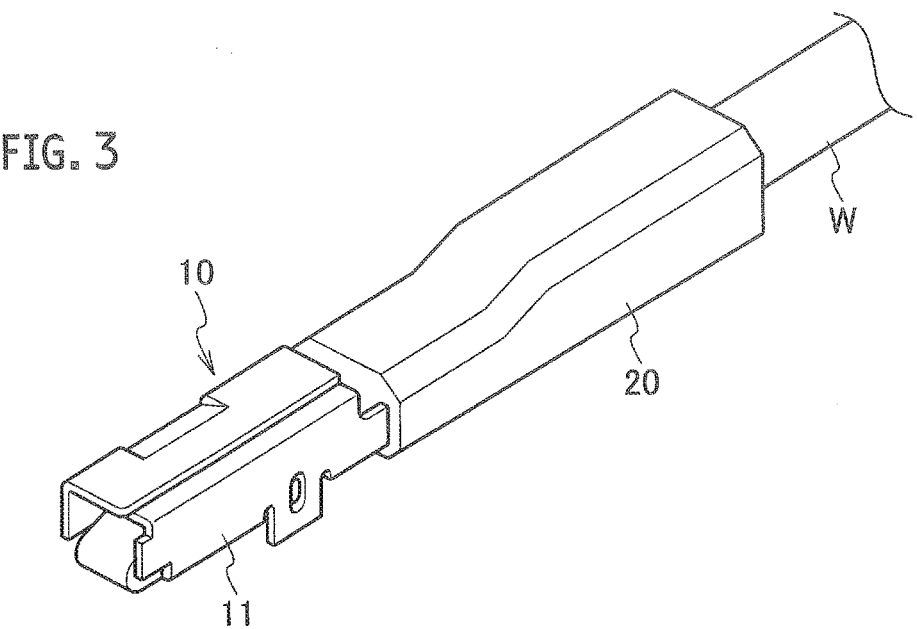
FIG. 3 is a perspective view of a finished product of the conventional electric wire with a terminal.
Figure 4:
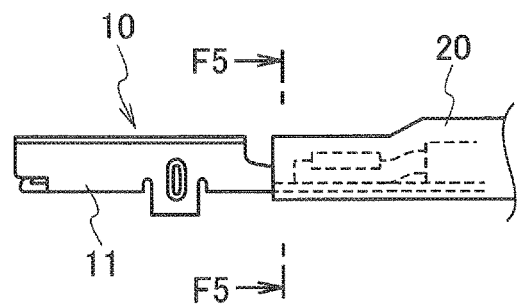
FIG. 4 is a side view of the finished product of the conventional electric wire with a terminal.
Figure 5:
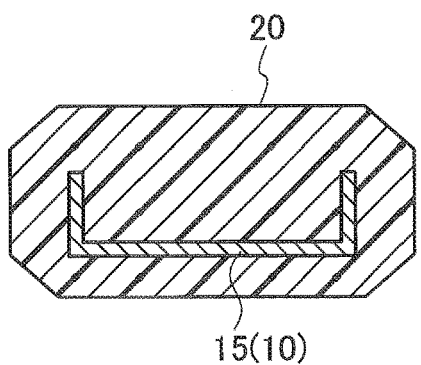
FIG. 5 is a cross-sectional view taken along line F5-F5 in FIG. 4.
Figure 6A:
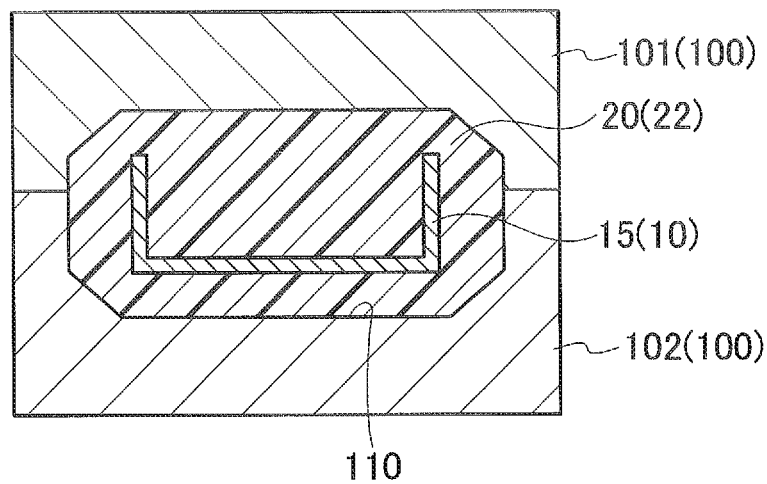
FIGS. 6A, 6B are illustrative diagrams of a release step in the manufacturing process of the conventional electric wire with a terminal.
Figure 6B:
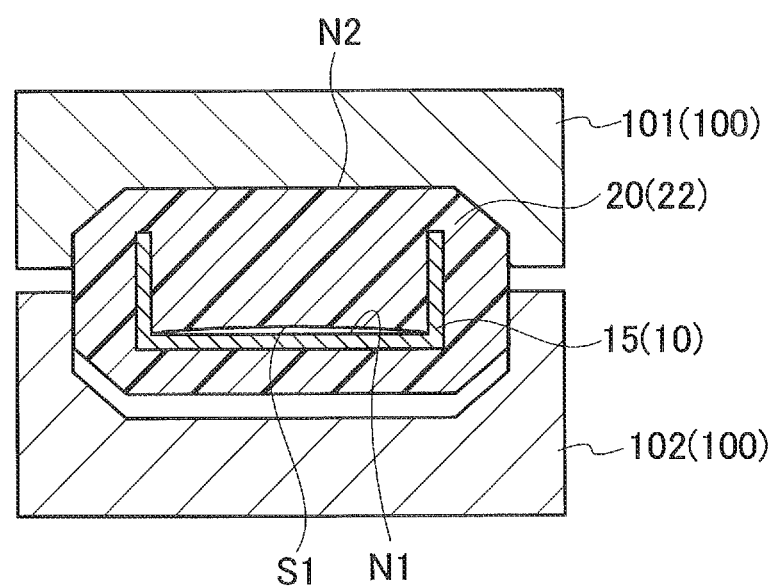
Figure 7:
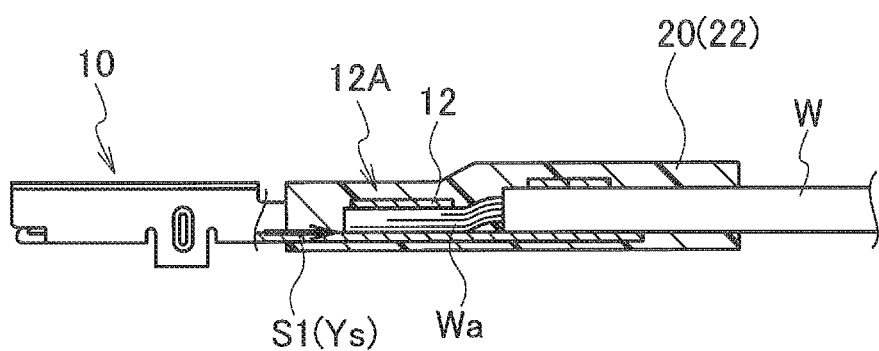
FIG. 7 is a side cross-sectional view for illustrating a problem which may occur in the conventional electric wire with a terminal.
Figure 8:
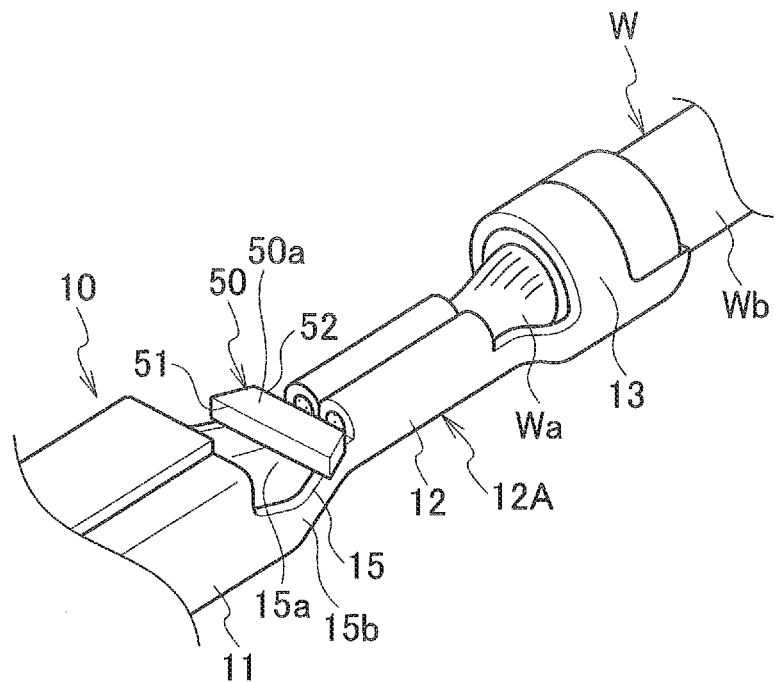
FIG. 8 is an illustrative diagram of part of a manufacturing process of an electric wire with a terminal according to a first embodiment of the present invention.
Figure 11:
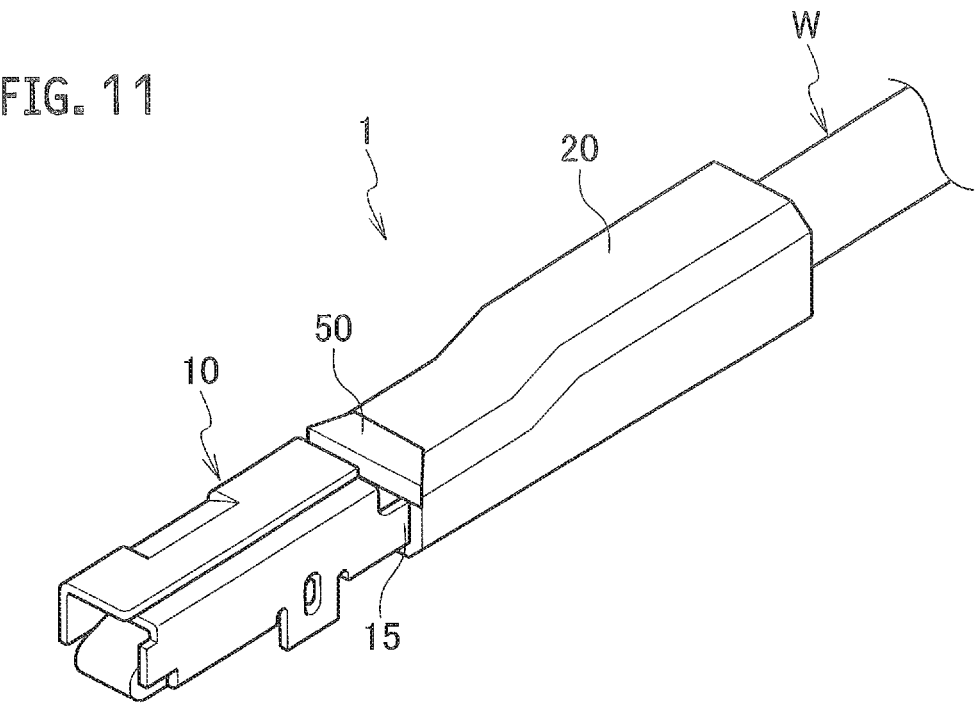
FIG. 11 is a perspective view of a finished product of the electric wire with a terminal according to the first embodiment of the present invention.
Figure 12:
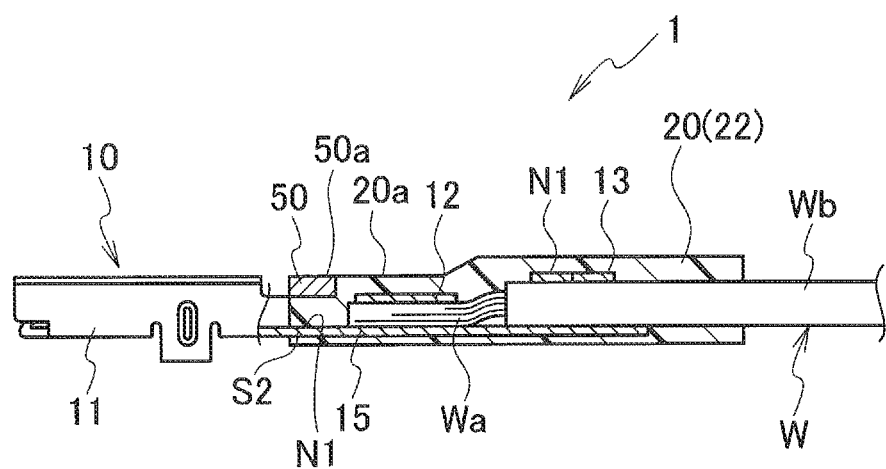
FIG. 12 is a cross-sectional view of the finished product of the electric wire with a terminal.

As shown in FIGS. 8, 11 and 12, an electric wire with a terminal 1 (see FIG. 11 for a finished product) which is manufactured here includes an electric wire W which has a conductor (core wire) Wa and an insulating coating Wb that coats the conductor Wa, a crimp terminal 10 which is connected to a terminal of the electric wire W, an anti-corrosive material 20 made of resin which is provided so as to coat a connection portion of the electric wire W and the crimp terminal 10 and a release promoting member 50.

The individual materials will be described below, and the conductor Wa of the electric wire W is made of aluminum or an aluminum alloy. Further, the insulating coating Wb of the electric wire W is made of polyethylene, polypropylene, an ethylene copolymer, a propylene copolymer, polyvinyl chloride or the like. Furthermore, the crimp terminal 10 is made of copper, a copper alloy, stainless steel, tin-plated copper, a tin-plated copper alloy, tin-plated stainless steel or the like. Moreover, the anti-corrosive material 20 is made of a resin material whose main component is a thermoplastic polyamide resin. The release promoting member 50 is made of the same type of metal plate as the crimp terminal 10.

As with the one described previously, the crimp terminal 10 has, in its front portion, an electrical connection portion (terminal connection portion) 11 which is fitted to a mating terminal so as to be electrically connected to the mating terminal. The crimp terminal 10 has, in its back portion, a conductor crimp portion 12 which is crimp-connected to the conductor Wa of the electric wire W through a connection portion 15. The crimp terminal 10 has, in its further back portion, a coating swaged portion 13 which is swaged to a portion of the electric wire W that is coated with the coated electric wire Wb.

A common terminal bottom plate 10a is extended from the electrical connection portion 11 to the coating swaged portion 13 in a forward/backward direction. As shown in FIG. 10, the connection portion 15, having a U-shaped cross section, includes the terminal bottom plate 10a, a common bottom plate 15a and left and right side plates 15b which stand up from both side edges of the bottom plate 15a in the width direction thereof.

The conductor crimp portion 12 is crimp-connected to the conductor Wa in a state where in the terminal of the electric wire W, an exposed portion of the conductor Wa protruding forward from the insulating coating Wb is placed on the terminal bottom plate 10a. Behind this crimp connection portion 12A, a coating swaged portion 13 is swaged so as to wrap the coated electric wire Wb of the electric wire W.

The anti-corrosive material 20 is injection-molded with a mold integrally with the electric wire W and the crimp terminal 10 so as to coat the conductor Wa, the circumference of the crimp connection portion 12A of the crimp terminal 10 and the circumference of the insulating coating Wb adjacent to the crimp connection portion 12A.

Specifically, the anti-corrosive material 20 is formed so as to coat the portion from a position where the outer circumference of the insulating coating Wb of the electric wire W extended backward of the coating swaged portion 13 is coated through the front end of the crimp connection portion 12A of the conductor crimp portion 12 to a position at a halfway point of the connection portion 15 in front of the electrical connection portion 11.

Further, on the upper surface of the front end portion of the anti-corrosive material 20, the solid release promoting member 50 which will be described in detail below is arranged. Although the release promoting member 50 may be left to the end in the electric wire with a terminal as a commercial product, it may be removed if it can be removed.

A method for manufacturing the electric wire with a terminal 1 according to the present embodiment will then be described.

When the electric wire with a terminal 1 is manufactured, first, as shown in FIG. 8, the crimp terminal 10 and the electric wire W are crimp-connected (crimp step).

Figure 9:
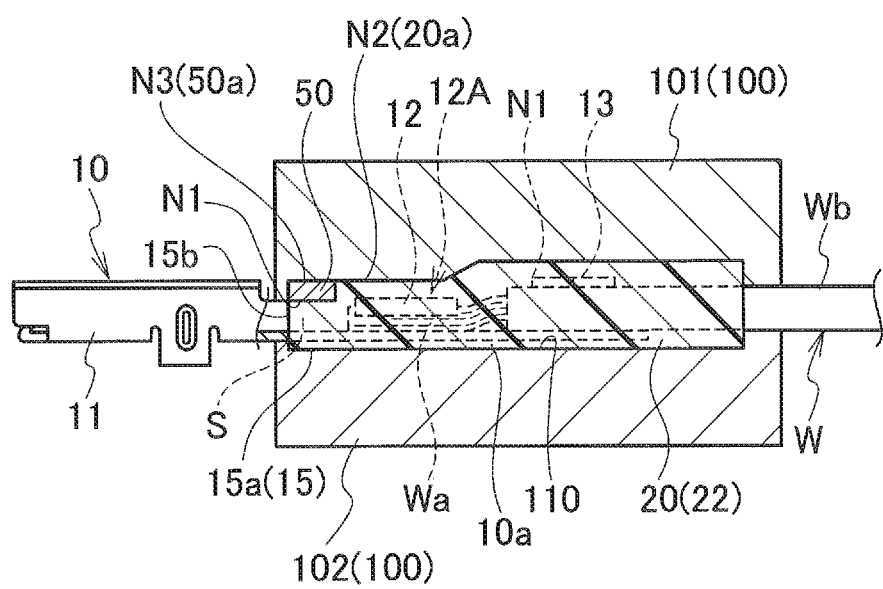
FIG. 9 is an illustrative diagram of a molding step in the manufacturing process of the electric wire with a terminal.

Then, as shown in FIG. 9, the crimp terminal 10 and the electric wire W are set in a mold 100 for injection molding in a state where all the range of the crimp connection portion 12A of the crimp terminal 10 and the electric wire W, the coating swaged portion 13 and the like on which anti-corrosive processing is performed is arranged within the cavity 110 of the mold 100 for molding composed of upper and lower molds 101 and 102 for molding the anti-corrosive material 20 (terminal setting step).

At that time, as shown in FIG. 8, the release promoting member 50 is previously placed so as to be bridged between the upper ends of both the left and right side plates 15b of the connection portion 15 in the crimp terminal 10. Then, in such a state, the connection portion of the crimp terminal 10 and the electric wire W is put into the cavity 110, and the crimp terminal 10 and the electric wire W are set in the mold 100.

In this case, the release promoting member 50 is arranged on a front of the crimp connection portion 12A and the front end of the conductor Wa and in a position within the cavity 110 corresponding to the upper surface of the front end portion of the anti-corrosive material 20.

The release promoting member 50 is intended for promoting the separation of a resin 22 forming the anti-corrosive material 20 and the mold 100 at the time of releasing of the mold 100, and is formed with a metal plate of the same type of material as the crimp terminal 10. The release promoting member 50 has a trapezoidal shape when seen from above, in which a wide bottom side 51 is located on the front side, and a narrow upper side 52 is located on the back side.

The release promoting member 50 is formed such that in a state where the mold 100 is closed, its upper surface 50a is brought into close contact with the upper surface of the inner wall of the cavity 110 for molding the upper surface 20a of the anti-corrosive material 20. In other words, the release promoting member 50 is formed such that the upper surface 50a of the release promoting member 50 is flush with the upper surface 20a of the anti-corrosive material 20.

Moreover, the release promoting member 50 is arranged in a state where a space S which is filled with the resin 22 is secured both between the release promoting member 50 and the crimp connection portion 12A as well as the conductor Wa and between the release promoting member 50 and the terminal bottom plate 10a of the crimp terminal 10.

Then, the crimp terminal 10 is set in the mold 100 while the release promoting member 50 is being inserted together as described above. Thereafter, the interior of the cavity 110 of the mold 100 is filled with the molten resin 22, and thus the anti-corrosive material 20 is molded (molding step).

After the molding, the mold 100 is released (the upper mold 101 and the lower mold 102 are separated), and thus a molded product is taken out (release step).

With the steps described above, it is possible to obtain the electric wire with a terminal 1 as shown in FIGS. 11 and 12.

In the method for manufacturing the electric wire with a terminal 1, the release promoting member 50 is arranged as described above, and thus when the mold 100 is released after the molding of the anti-corrosive material 20, the release promoting member 50 serves as the starting point for the separation, with the result that it is possible to actively promote the separation of the resin 22 on the back side of the release promoting member 50 and the mold 100.

Figure 10A:
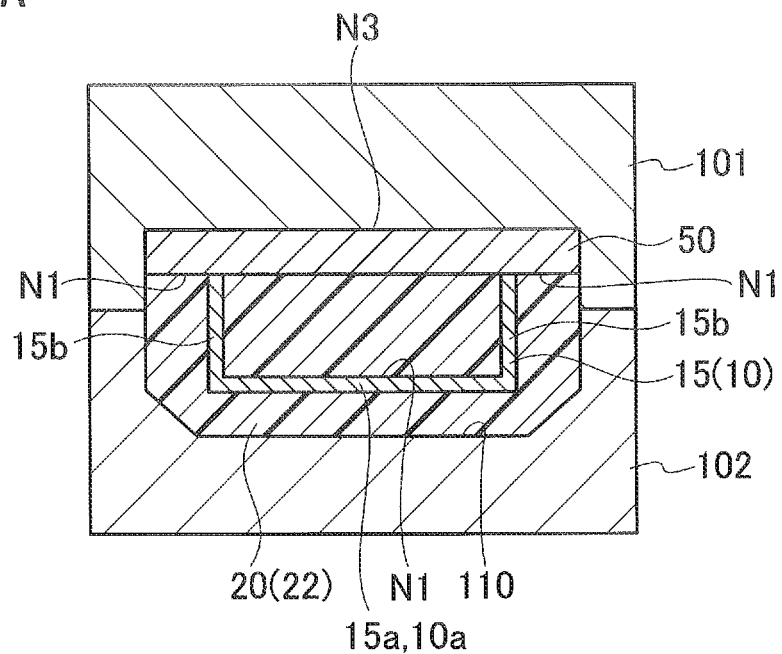
FIGS. 10A, 10B are illustrative diagrams of a release step in the manufacturing process of the electric wire with a terminal.

In other words, as shown in FIG. 10A, on the upper surface of the front end portion of the anti-corrosive material 20, the upper surface 50a of the release promoting member 50 is brought into close contact with the upper surface of the inner wall of the cavity 110 in the mold 100, and since in an interface N3 between the mold 100 and the release promoting member 50, the metal and the metal are brought into close contact with each other, almost no adhesion force is produced. On the other hand, since the lower surface of the release promoting member 50 is brought into close contact with the resin 22, a large close contact force acts on an interface N1 between the release promoting member 50 and the resin 22. Moreover, on the back side of the release promoting member 50, the resin 22 and the mold 100 are brought into close contact with each other, and thus a large close contact force is produced in this interface N2.

Figure 10B:
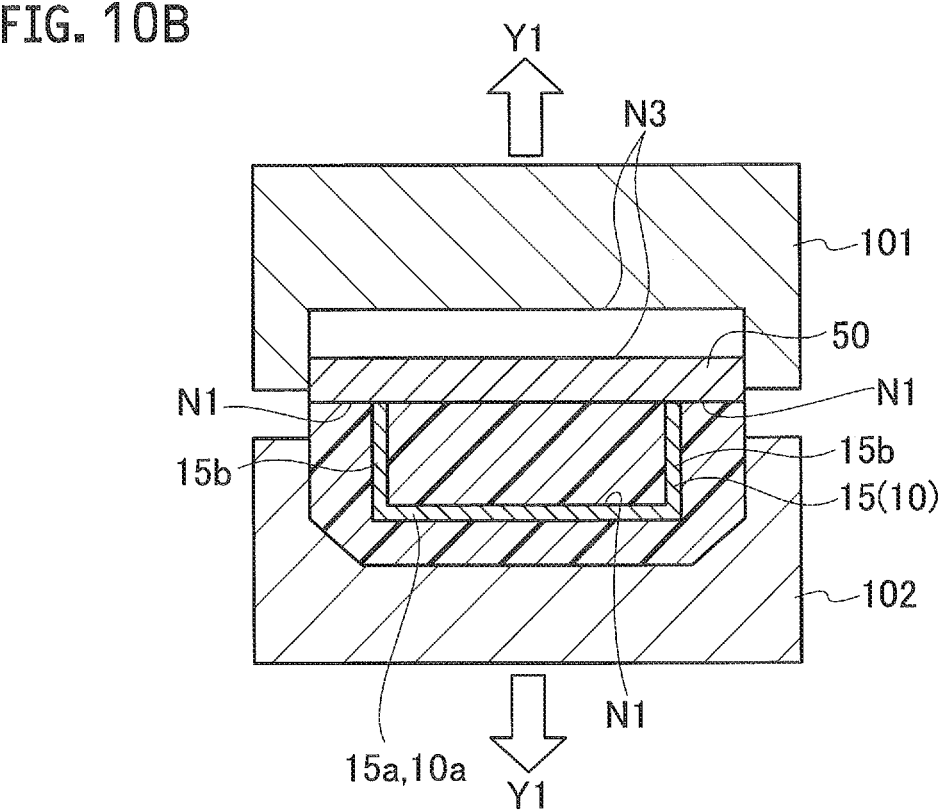

However, as shown in FIG. 10B, when the upper mold 101 and the lower mold 102 are released as indicated by arrows Y1, the interface N3 between the release promoting member 50 and the mold 100 serves as the starting point, and thus the separation of the interface N2 between the resin 22 and the mold 100 on the back side of the release promoting member 50 is actively promoted. Hence, even when resin which has a strong adhesion to metal is used as the material of the anti-corrosive material 20 without the application of primer, it is possible to prevent the resin 22 for the anti-corrosive material 20 from being brought into close contact with the mold 100 at the time of releasing.

Consequently, in particular, in the connection portion 15 which is the entrance side of a water intrusion path in the crimp terminal 10, it is possible to prevent a gap from being formed by the separation in the interface between the resin 22 forming the anti-corrosive material 20 and the crimp terminal 10. Specifically, since it is possible to prevent a gap from being formed in a position indicated by S2 in FIG. 12, the problem that water invades the interior of the crimp connection portion 12A through the gap to corrode the electric wire can be solved, and it is possible to enhance the anti-corrosive performance.

In particular, the release promoting member 50 is arranged only in the front end (the entrance side of the water intrusion path) of the anti-corrosive material 20, and thus it is possible to minimize the size of the release promoting member 50, and there is no worry that the filling of the resin 22 for the anti-corrosive material 20 is inhibited.

Furthermore, since it is possible to enhance the stability of the place of the connection portion 15 that is the entrance side of the water intrusion path, which is most problematic for the separation, it is possible to manufacture a highly reliable electric wire with a terminal 1.

Moreover, according to this embodiment, it is possible to arrange the release promoting member 50 in an appropriate position only by placing the release promoting member 50 on the connection portion 15, and thus its operation is easily performed.

In addition, the release promoting member 50 is formed of the same type of metal material as the crimp terminal 10, and thus problems occurring between different types of metals are prevented.

Additionally, although in the embodiment described above, the case where the release promoting member 50 is formed with the metal plate of the same type of material as the crimp terminal 10 is described, a material other than metal may be used as long as the material has the effect of promoting the releasing.

Note that, as a second embodiment, the release promoting member 50 can be formed integrally with the crimp terminal 10.

Figure 13:
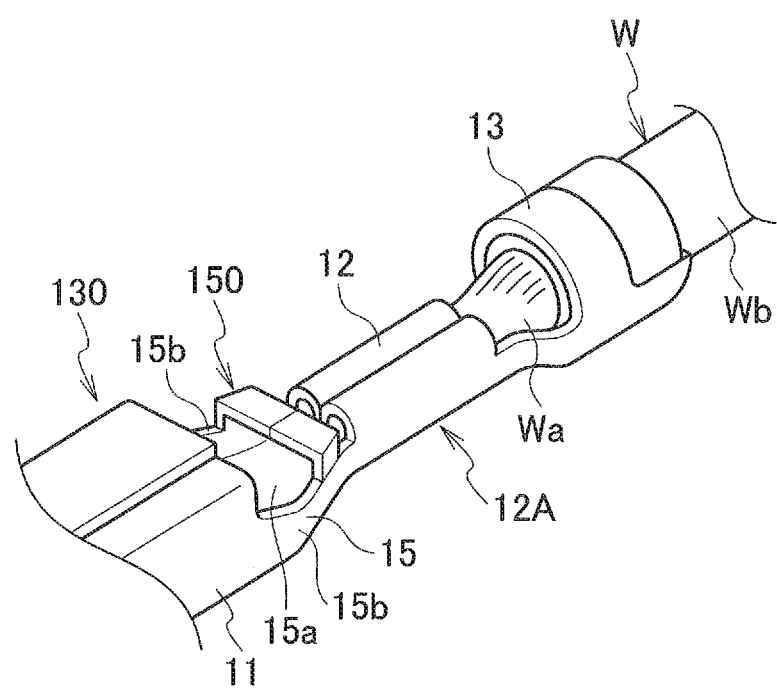
FIG. 13 is an illustrative diagram of part of a manufacturing process of an electric wire with a terminal according to a second embodiment of the present invention.

FIG. 13 shows part of a manufacturing process of an electric wire with a terminal according to the second embodiment. In this crimp terminal 130, a bridge-shaped frame portion 150 which corresponds to the release promoting member is provided integrally with the connection portion 15 between the electrical connection portion 11 and the conductor crimp portion 12. The frame portion 150 plays the same role as the release promoting member 50 in the embodiment described previously.

Here, the type of the crimp terminals 10 and 130 may be a male-type terminal or a female-type terminal.

A third embodiment of the present invention will then be described with reference to drawings.

Figure 14A:
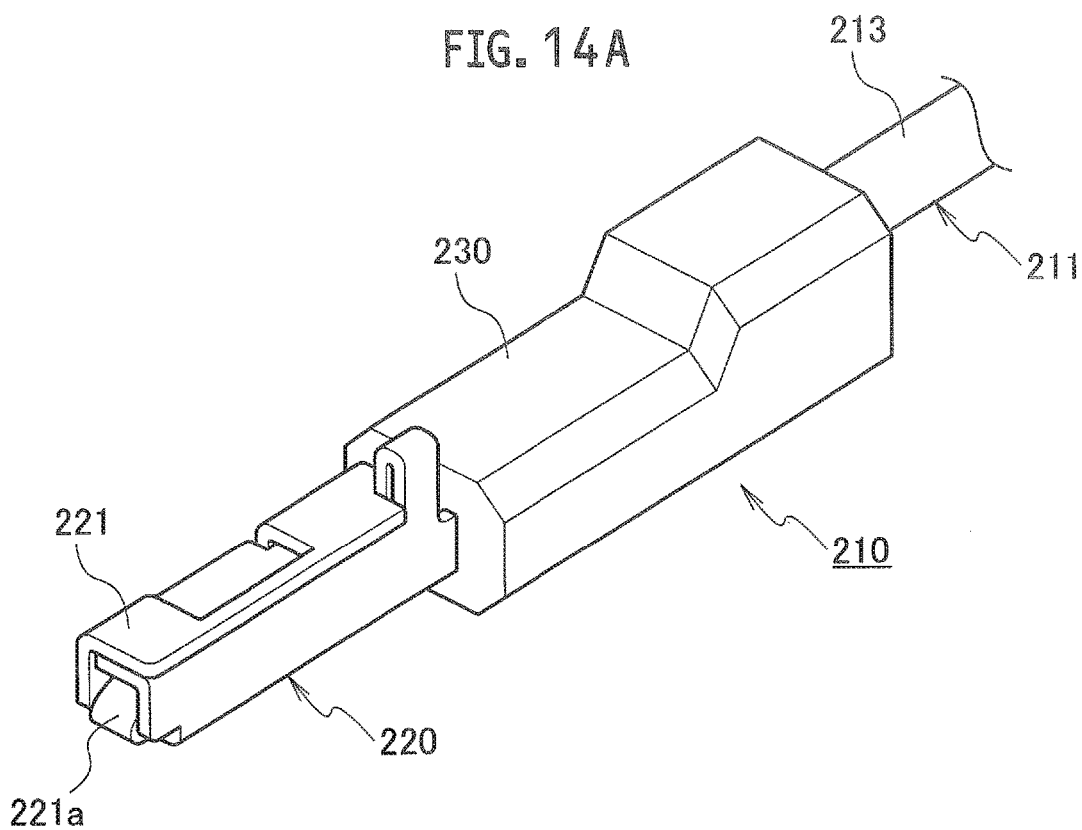
FIG. 14A is a perspective view showing an electric wire with a terminal according to a third embodiment of the present invention.
Figure 14B:
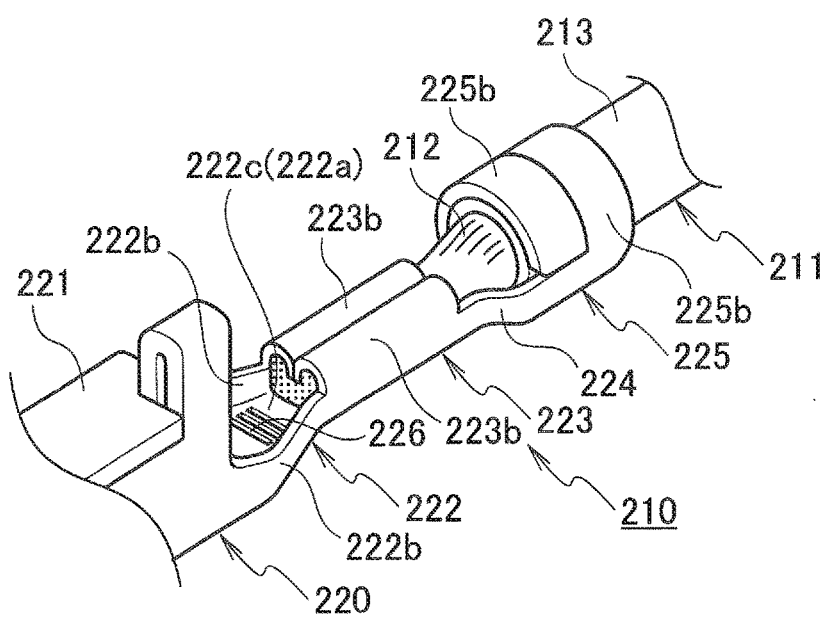
FIG. 14B is a perspective view showing a main portion of the electric wire with a terminal before the molding of an anti-corrosive material.

As shown in FIGS. 14A and 14B, an electric wire with a terminal 210 includes an aluminum electric wire (electric wire) 211 and a female-type crimp terminal 220 which is made of copper or a copper alloy. The aluminum electric wire 211 includes a core wire (conductor) 212 which is made of aluminum or an aluminum alloy and an insulating coating 213 which is made of insulating resin to coat the core wire 212. The crimp terminal 220 includes a terminal connection portion (electrical connection portion) 221 which is connected to an unillustrated mating terminal, a core wire crimp portion 223 which is crimped to the core wire 212 exposed from the end portion of the aluminum electric wire 211 and a coating crimp portion 225 which is crimped to the insulating coating 213 at the end of the aluminum electric wire 211.

Figure 17:
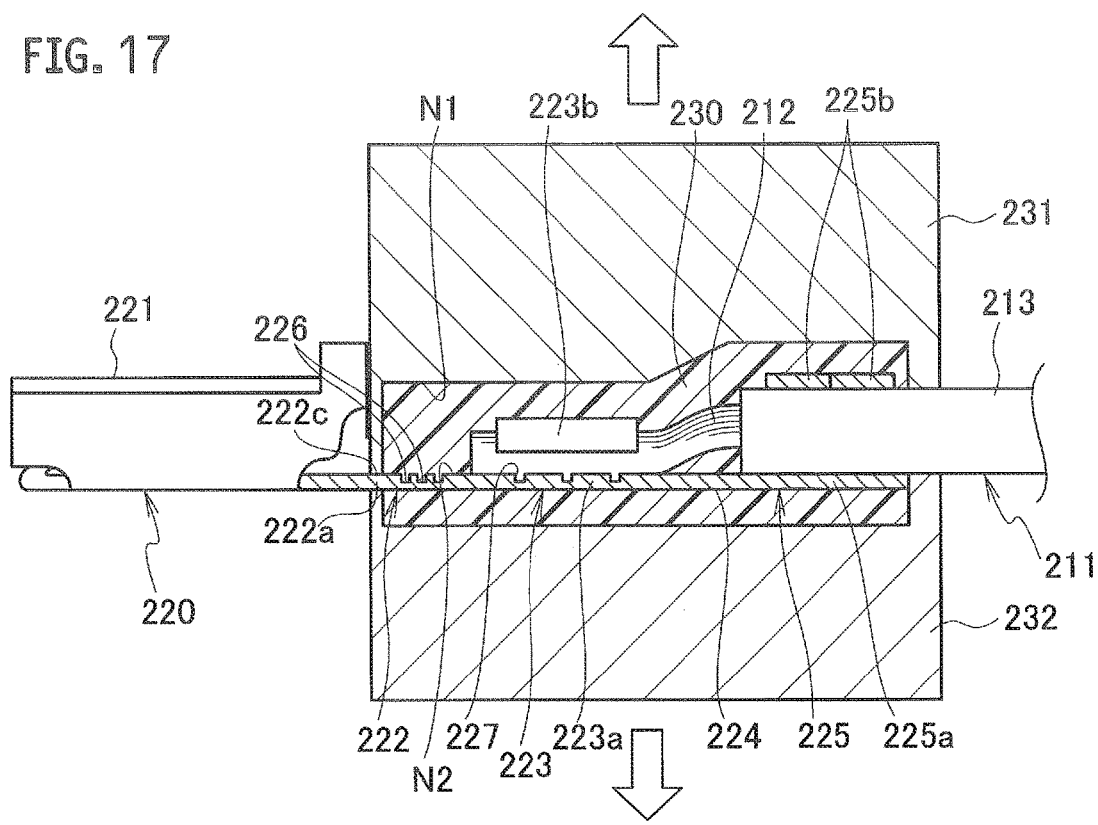
FIG. 17 is a cross-sectional view when the mold is released after the anti-corrosive material is molded integrally in the circumference of a connection portion of the crimp terminal and the electric wire.

Further, as shown in FIGS. 14A, 14B and 17, an anti-corrosive material (anti-corrosive resin member) 230 made of insulating resin is integrally molded with upper and lower molding molds 231 and 232 from the circumference of a coupling portion (connection portion) 222 connecting the terminal connection portion 221 and the core wire crimp portion 223 of the crimp terminal 220 to the circumference of the coating crimp portion 225.

As shown in FIG. 14A, the terminal connection portion 221 is formed by being bent into the shape of a box, and a spring piece 221a which is engaged with the mating terminal is formed therewithin by being bent.

Figure 16A:
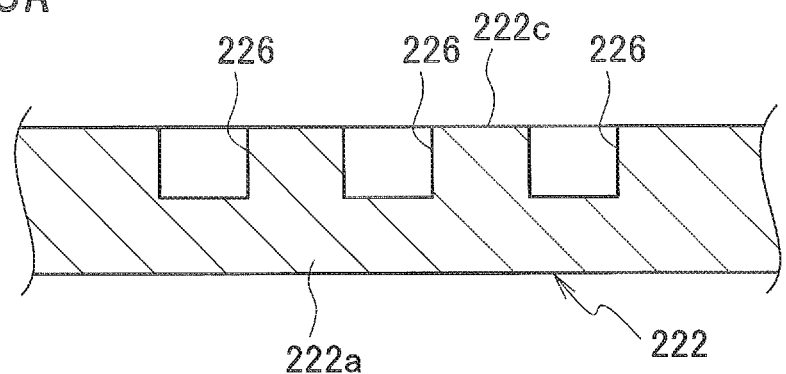
FIG. 16A is a cross-sectional view of a bottom plate portion of a coupling portion of the crimp terminal.
Figure 16B:
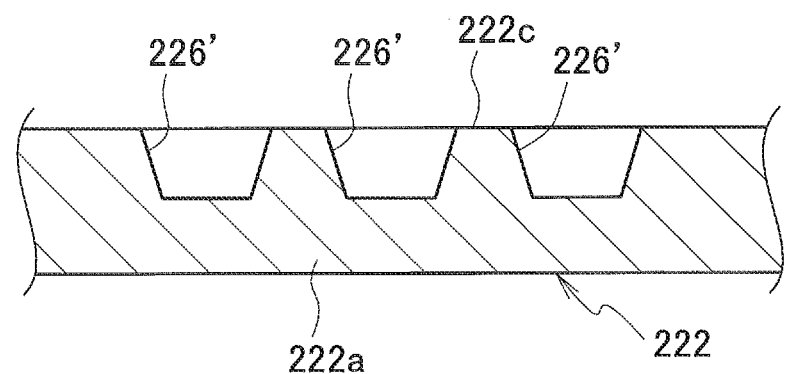
FIG. 16B is a cross-sectional view of another example of the bottom plate portion of the coupling portion and FIG. 16C is a cross-sectional view of yet another example of the bottom plate portion of the coupling portion.
Figure 16C:
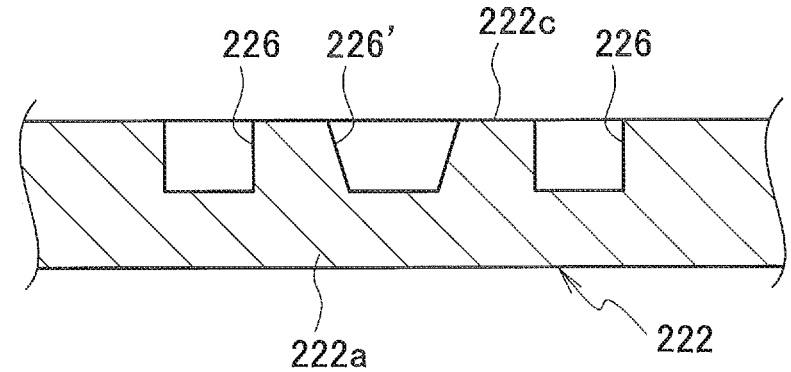

Moreover, as shown in FIG. 14B, the coupling portion 222 is formed into the U-shape with a bottom plate portion 222a and a pair of side plate portions 222b and 222b which are provided so as to be extended upward from both left and right side edges of the bottom plate portion 222a. As shown in FIGS. 15 and 16A, in the inner surface 222c of the bottom plate portion 222a, a vertical groove (groove) 226 for close contact with resin is formed in plurality (three in the present embodiment) in a concave shape so as to be extended parallel to a direction perpendicular to the longitudinal direction of the crimp terminal 220. The grooves for close contact with resin are not limited to the vertical grooves 226 whose both side wall surfaces are vertical surfaces, and may be, as shown in FIG. 16B, tapered grooves 226' whose both side wall surfaces are inclined or may be, as shown in FIG. 16C, grooves in which the tapered groove 226' is formed between the vertical grooves 226 and 226 on both sides. Since a sliding friction force acts, the vertical grooves 226 are accordingly effective as compared with the tapered grooves 226'.

As shown in FIGS. 14B and 15, the core wire crimp portion 223 has the cross section formed into substantially a U-shape with a bottom plate portion 223a and a pair of conductor swaged pieces 223b and 223b which are provided to be extended upward from both left and right side edges of the bottom plate portion 223a and which swage and wrap the core wire 212 exposed from the end portion of the aluminum electric wire 211 arranged on the inner surface of the bottom plate portion 223a. In the inner surface of the bottom plate portion 223a, a concave groove-shaped serration 227a is formed in plurality (three in the present embodiment) which extends parallel to the direction perpendicular to the longitudinal direction of the crimp terminal 220. The respective serrations 227 are intended for enhancing electrical connection to the core wire 212 and an electric wire pulling force.

Moreover, as shown in FIGS. 14B and 15, the coating crimp portion 225 has the cross section formed into substantially a U-shape with a bottom plate portion 225a and a pair of coating swaged pieces 225b and 225h which are provided to be extended upward from both left and right side edges of the bottom plate portion 225a and which swage and wrap the insulating coating 213 at the end portion of the aluminum electric wire 211 arranged on the inner surface of the bottom plate portion 225a. Here, the core wire crimp portion 223 and the coating crimp portion 225 are connected with a coupling portion 224.

When the electric wire with a terminal 210 of the present embodiment is manufactured, as shown in FIG. 17, the female-type crimp terminal 220 to which the electric wire 211 is connected by being crimped is set within the cavity of the upper and lower molding molds 231 and 232. Then, liquid thermoplastic polyamide resin serving as the material of the anti-corrosive material 230 is filled and solidified in the interior of the cavity of the upper and lower molding molds 231 and 232, and thereafter taken out of the upper and lower molding molds 231 and 232, and thus the anti-corrosive material 230 is integrally molded.

Figure 18:
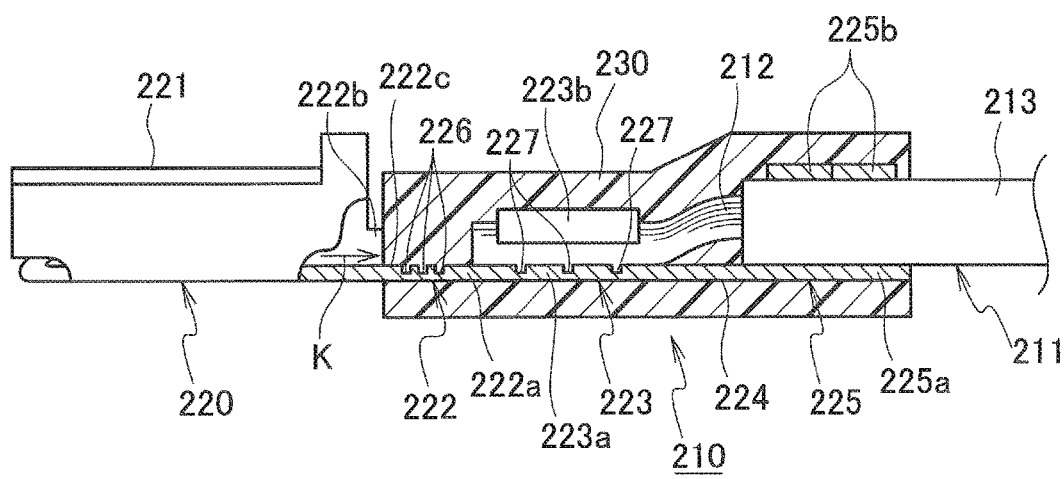
FIG. 18 is a cross-sectional view of the electric wire with a terminal in which the anti-corrosive material is molded integrally in the circumference of the connection portion of the crimp terminal and the electric wire.

When the upper and lower molding molds 231 and 232 are released, the anti-corrosive material 230 is temporarily pulled in a state where the anti-corrosive material 230 adheres to the upper and lower molding molds 231 and 232, and thus the crimp terminal 220 and the anti-corrosive material 230 tend to be separated from each other. However, an adhesion force of the anti-corrosive material 230 caused by the vertical grooves 226 for close contact with resin formed in the inner surface 222c of the bottom plate portion 222a of the coupling portion 222 in the crimp terminal 220 exceeds it. Hence, specifically, as shown in FIG. 17, when the upper and lower molding molds 231 and 232 are released, the close contact force of an interface N2 between the vertical grooves 226 for close contact with resin in the crimp terminal 220 and the resin of the anti-corrosive material 230 is greater than the close contact force of an interface N1 between the cavity of the upper and lower molding molds 231 and 232 and the resin of the anti-corrosive material 230. Thus, it is possible to reliably prevent a gap from being formed between the bottom plate portion 222a of the coupling portion 222 on the entrance side of a water intrusion path (reference sign K shown in FIG. 18) and the anti-corrosive material 230. In this way, since it is possible to reliably prevent the crimp terminal 220 and the anti-corrosive material 230 from being separated from each other at the time of releasing in the molding of the anti-corrosive material 230, as shown in FIG. 18, no gap is formed on the entrance side of the water intrusion path K on the inner surface 222c of the bottom plate portion 222a of the coupling portion 222 in the crimp terminal 220. Hence, it is possible to reliably prevent the intrusion of water and chloride ions which cause the corrosion, and it is possible to effectively prevent the corrosion of the connection portion of the core wire crimp portion 223 of the crimp terminal 220 and the core wire 212 of the electric wire 211, which is the contact surface of different types of metals.

As described above, in the present embodiment, the vertical groove 226 for close contact with resin is formed in plurality in the inner surface 222c of the bottom plate portion 222a of the coupling portion 222 in the crimp terminal 220 which is the entrance side of the water intrusion path K. In this way; at the time of releasing in the molding of the resin of the anti-corrosive material 230, the adhesion force of the bottom plate portion 222a of the coupling portion 222 on the entrance side of the water intrusion path K and the anti-corrosive material 230 (the close contact force of the contact interface between the crimp terminal 220 and the anti-corrosive material 230) can be reliably enhanced by a sliding friction force caused by a plurality of concave vertical grooves 226. Thus, it is possible to reliably prevent a gap from being formed on the entrance side of the water intrusion path K on the inner surface 222c of the bottom plate portion 222a of the coupling portion 222. Hence, it is possible to further enhance the anti-corrosive performance of the connection portion of the core wire crimp portion 223 of the crimp terminal 220 and the core wire 212 of the electric wire 211, which is the contact surface of different types of metals.

Figure 19:
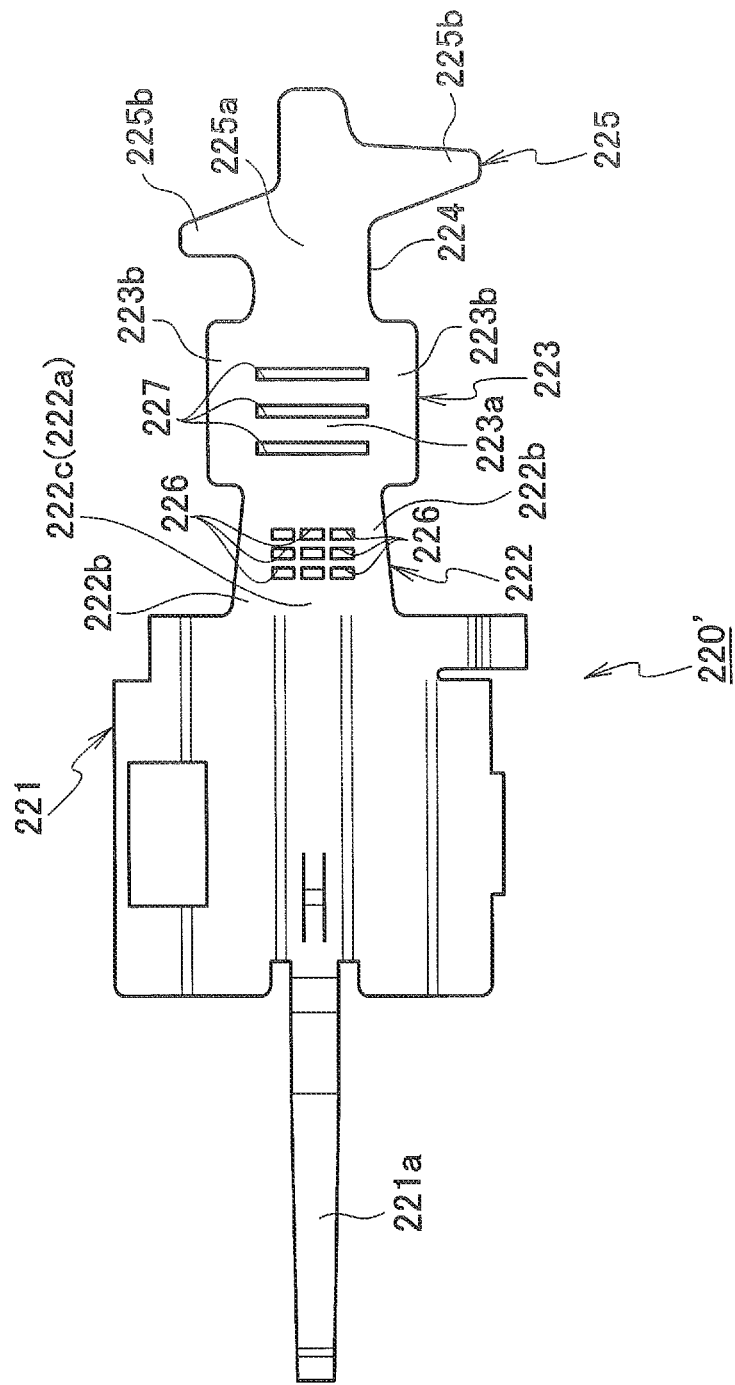
FIG. 19 is a development view of a crimp terminal used in an electric wire with a terminal according to a fourth embodiment of the present invention.

FIG. 19 is a development view of a crimp terminal used in an electric wire with a terminal according to a fourth embodiment of the present invention.

In the fourth embodiment, in the inner surface 222c of the bottom plate portion 222a of the coupling portion 222 in a crimp terminal 220', a plurality of vertical grooves (grooves) 226 for close contact with resin is formed in a plurality of rows (three rows each with three grooves in the present embodiment) at a predetermined distance apart parallel to each other in a direction perpendicular to the longitudinal direction of the crimp terminal 220. Note that, since the other configurations are the same as those in the third embodiment, the same constituent members are identified with the same reference signs, and the detailed description thereof will be omitted.

In the fourth embodiment also, as in the third embodiment, a plurality of rows of a plurality of vertical grooves 226 for close contact with resin is formed in the inner surface 222c of the bottom plate portion 222a of the coupling portion 222 which is the entrance side of the water intrusion path. In this way, at the time of releasing in the molding of the resin of the anti-corrosive material 230, the adhesion force (close contact force) of the bottom plate portion 222a of the coupling portion 222 on the entrance side of the water intrusion path and the anti-corrosive material 230 can be reliably enhanced by a sliding friction force caused by a plurality of rows of a plurality of concave vertical grooves 226. Thus, it is possible to reliably prevent a gap from being formed on the entrance side of the water intrusion path K on the inner surface 222c of the bottom plate portion 222a of the coupling portion 222. Hence, it is possible to further enhance the anti-corrosive performance of the connection portion of the core wire crimp portion 223 of the crimp terminal 220 and the core wire 212 of the electric wire 211, which is the contact surface of different types of metals.

Note that, although in the respective embodiments described above, the core wire (conductor) of the electric wire is made of aluminum or an aluminum alloy, it may be made of copper or a copper alloy or the like. Moreover, although the crimp terminal is made of copper or a copper alloy, it may be made of aluminum or an aluminum alloy, stainless steel or the like. In addition, the crimp terminal is not limited to a male type, and may be a female type or a male/female type. Additionally, although as the material of the anti-corrosive material (anti-corrosive resin body), a thermoplastic polyamide resin is used, another insulating resin such as a polypropylene resin may be used. Furthermore, although in the inner surface of the bottom plate portion of the coupling portion which is the entrance side of the water intrusion path, the concave groove for close contact with resin is formed in plurality so as to be extended parallel to each other in a direction perpendicular to the longitudinal direction of the terminal, in each of the inner surfaces of a pair of side plate portions in the coupling portion, the concave groove for close contact with resin may be formed concavely in plurality so as to be extended parallel to each other in the longitudinal direction of the terminal.

What is claimed is:

1. An electric wire with a terminal, comprising:
   an electric wire which includes a conductor and an insulating coating to coat the conductor;
   a crimp terminal which includes a conductor crimp portion that is crimp-connected to the conductor in a state where an exposed portion of the conductor protruding forward from the insulating coating at a terminal of the electric wire is placed on a terminal bottom plate extended in a forward/backward direction;
   an anti-corrosive material which is made of resin and molded integrally with the electric wire and the crimp terminal so as to coat the conductor, a circumference of a crimp connection portion of the crimp terminal and a circumference of the insulating coating adjacent to the crimp connection portion; and
   a release promoting member which is arranged on a front side of the crimp connection portion and a front end of the conductor and in a position of an upper surface of a front end portion of the anti-corrosive material, which is brought into close contact with an upper surface of an inner wall of a cavity in a mold for molding the anti-corrosive material when the anti-corrosive material is molded and which promotes release of the mold from the resin forming the anti-corrosive material when the mold is released.

2. The electric wire with a terminal according to claim 1, wherein the release promoting member is made of the same type of metal plate as the crimp terminal.

3. The electric wire with a terminal according to claim 1, wherein the release promoting member can be removed from the electric wire as a commercial product.

4. The electric wire with a terminal according to claim 1, wherein the release promoting member is placed so as to be bridged between upper ends of both left and right side plates of the connection portion in the crimp terminal.

* * * * *